Patented Mar. 7, 1939

2,150,001

UNITED STATES PATENT OFFICE 2,150,001

MANUFACTURE OF DI-(γ-CHLORO-HYDROXYPROPYL) ARYLAMINES

Hans Lange, Dessau in Anhalt, Germany, assignor to General Aniline Works, Inc., New York, N. Y., a corporation of Delaware No Drawing. Application March 25, 1937, Serial No. 132,971. In Germany April 18, 1936

11 Claims. (Cl. 260—573)

My present invention relates to new substitution products of arylamines and more particularly to those being substituted in the amino group by two γ-chlorohydroxypropyl groups. Thus, my new products correspond to the general formula

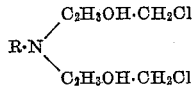

wherein R means a radicle of the benzene series.

A further object of my invention is the process for manufacturing the said substituted amines.

In the action of epichlorhydrin or primary aromatic amines there have hitherto been obtained only mono-substitution products in the form of well crystallized compounds. Thus by boiling para-toluidine with 1 mol. epichlorhydrin in alcoholic solution the α-(4-methylphenylamino)-β-hydroxy-γ-chloropropane (Berichte der Deutschen Chemischen Gesellschaft, vol. 37, pages 3034–3035) is obtained, and by boiling orthoaminobenzyl alcohol even with double or treble its weight of epichlorhydrin (Berichte der Deutschen Chemischen Gesellschaft, vol. 27, pages 1086–1087) there is also obtained after quite a short heating only a mono-substitution product and after a longer heating a resinification product which did not lend itself to the identification of any individual compounds. Only lately has there been a statement (Chemisches Centralblatt 1935, I, page 2806) that a di-substitution product can be obtained; when para-phenetidine hydrochloride in aqueous solution was left in contact with 3 mol. epichlorhydrin for three days in the dark there was obtained after a tedious treatment a crystallized hydrochloride of N-di(γ-chloro-β-hydroxypropyl)-para-phenetidine.

This invention consists in the manufacture by a simple technical method and in good yield from a primary aromatic amine of the benzene series and epichlorhydrin a di-(γ-chloro-α- or β-hydroxypropyl)-arylamine by heating the amine with 2 mol. epichlorhydrin, or preferably about 10 per cent. of excess, in an organic solvent, advantageously methanol or carbon tetrachloride. After distilling the solvent the compound crystallizes either directly or from another suitable solvent, for instance, carbon tetrachloride; or it may be obtained in the form of a well crystallized hydrochloride.

It might reasonably be supposed that epichlorhydrin, like ethylene oxide which contains the same ring, would enter twice into the amino group; by the double addition of epichlorhydrin to the amine, however, in contrast with ethylene oxide, theoretically three isomerides will be produceable:

I. 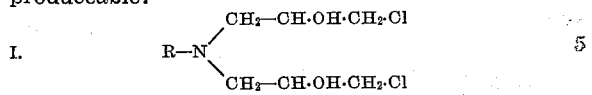

Di-α-(γ-chloro-β-hydroxypropyl)-arylamine

II. 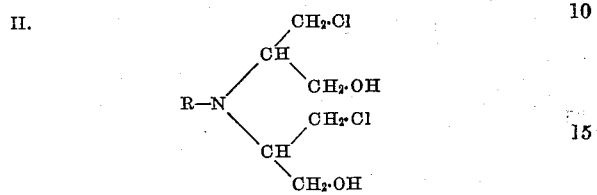

Di-β-(γ-chloro-α-hydroxypropyl)-arylamine and

III. 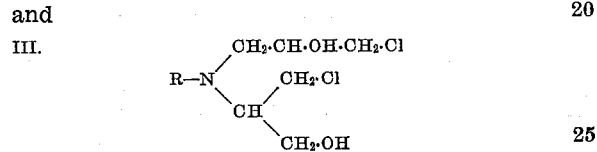

In fact, in the case of the aniline derivatives, it was possible to establish by recrystallization the presence of two isomerides. It could not be foreseen that such a mixture of isomerides would be obtained in a form easily isolated or indeed crystallized and that the individual isomerides could be separated.

The new compounds are valuable intermediate products for the manufacture of dyes.

The following examples illustrate the invention, the parts being by weight:

*Example 1.*—A mixture of 465 parts of aniline, 1000 parts of carbon tetrachloride and 1030 parts of epichlorhydrin is heated under reflux for 36 hours. After cooling and standing for several hours in ice the crystals which have separated are filtered. There are obtained 980 parts of di-α-(γ-chloro-β-hydroxypropyl)-aniline in the form of a crystallized product (71 per cent. of the theory). By repeated recrystallization from benzene two isomerides are obtained, one of which melts at 94° C. and the other at 91.5° C.

*Example 2.*—107 parts of 1-methyl-3-aminobenzene are mixed with 206 parts of epichlorhydrin and 100 parts of methanol. After 1½ hours the solution becomes spontaneously heated to boiling. After several hours the solvent is distilled and the syrupy residue is dissolved in benzene. On cooling there separates from the mixture of isomerides a crystallized body, probably 1-methyl-3-di-α-(γ-chloro-β-hydroxypropyl)-aminobenzene. When recrystallized from benzene it melts at 93° C.

In the same manner the corresponding 1-chloro-3-di-α-(γ-chloro-β-hydroxypropyl)-aminobenzene is obtainable when starting from 1-chloro-3-aminobenzene.

Example 3.—685 parts of 1-methyl-3-amino-4-methoxybenzene are mixed with 1000 parts of methanol and 1030 parts of epichlorhydrin and the mixture is boiled for 16 hours under reflux. The methanol is then distilled and the residue is stirred with 500 parts of water and 500 parts of concentrated hydrochloric acid. On cooling with ice the hydrochloride of 1-methyl-3-di-α-(γ-chloro-β-hydroxypropyl)-amino-4-methoxybenzene separates in the form of a white crystalline mass. It is filtered, washed with ice water and dried at 100° C. There are obtained 1145 parts of hydrochloride corresponding with 64 per cent. of the theory; it melts at 200 to 201° C.

It is obvious that the invention is not limited to the foregoing examples or to the specific details given therein. In the examples carbontetrachloride and methanol are indicated as solvents, in which the condensation with epichlorhydrin may be carried out, I may use, however, likewise aromatic hydrocarbons, such as benzene. On the other hand, the primary amine used as starting materials may contain alkyl, alkoxy or halogen substituents in ortho- or meta-position to the amino group, the para-position should be, however, unsubstituted, so that the end product is capable to couple with aromatic diazo compounds.

What I claim is:

1. The compounds which correspond to the general formula

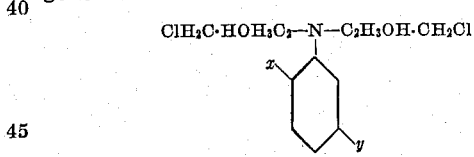

wherein $x$ and $y$ are members of the group consisting of hydrogen, lower alkyl, lower alkoxy, and halogen, said tertiary amines being crystallized bodies, and coupling with diazo compounds.

2. The compounds which correspond to the general formula

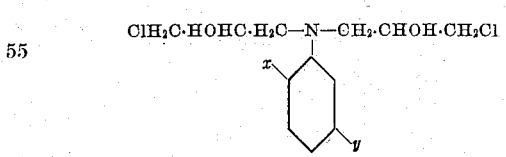

wherein $x$ and $y$ are members of the group consisting of hydrogen, lower alkyl, lower alkoxy, and halogen, said tertiary amines being crystallized bodies, and coupling with diazo compounds.

3. The compounds which correspond to the general formula

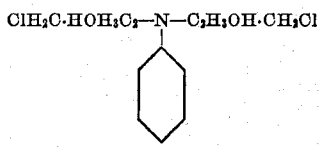

said tertiary amines being crystallized bodies, coupling with diazo compounds.

4. Di-α-(γ-chloro-β-hydroxypropyl)-aminobenzene.

5. The compounds which correspond to the general formula

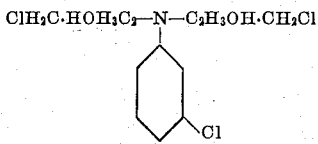

said tertiary amines being crystallized bodies coupling with diazo compounds.

6. 1-chloro-3-di-α-(γ-chloro-β-hydroxy-propyl)-aminobenzene.

7. The compounds which correspond to the general formula

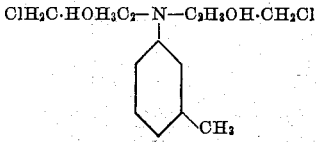

said tertiary amines being crystallized bodies coupling with diazo compounds.

8. 1-methyl-3-di-α-(γ-chloro-β-hydroxypropyl)-aminobenzene.

9. The process which comprises heating to boiling at ordinary pressure an aromatic amine of the general formula

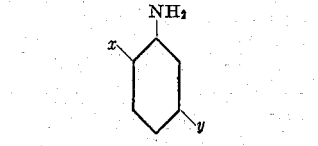

wherein $x$ and $y$ are members of the group consisting of hydrogen, lower alkyl, lower alkoxy, and halogen, in an organic solvent of the group consisting of methylalcohol, carbontetrachloride and benzene with at least the double molar equivalent of epichlorhydrin calculated on the said amine.

10. The process which comprises heating to boiling at ordinary pressure 1-amino-3-methylbenzene in an organic solvent of the group consisting of methylalcohol, carbontetrachloride and benzene, with at least the double molar equivalent of epichlorhydrin calculated on the said amine.

11. The process which comprises heating to boiling at ordinary pressure 1-amino-3-chlorobenzene in an organic solvent of the group consisting of methylalcohol, carbontetrachloride and benzene, with at least the double molar equivalent of epichlorhydrin calculated on the said amine.

HANS LANGE.